(12) United States Patent
Lee et al.

(10) Patent No.: US 9,810,349 B2
(45) Date of Patent: Nov. 7, 2017

(54) MODULAR CONDUIT SYSTEM

(71) Applicants: James M. Lee, Georgetown, TX (US); Jinze Gong, Yuyao (CN)

(72) Inventors: James M. Lee, Georgetown, TX (US); Jinze Gong, Yuyao (CN)

( * ) Notice: Subject to any disclaimer, the term of this patent is extended or adjusted under 35 U.S.C. 154(b) by 277 days.

(21) Appl. No.: 14/519,315

(22) Filed: Oct. 21, 2014

(65) Prior Publication Data

US 2016/0109046 A1    Apr. 21, 2016

(51) Int. Cl.
*F16L 21/00* (2006.01)
*F16L 9/22* (2006.01)
*F16L 11/18* (2006.01)
*F16L 27/04* (2006.01)

(52) U.S. Cl.
CPC ............... *F16L 9/22* (2013.01); *F16L 11/18* (2013.01); *F16L 27/04* (2013.01)

(58) Field of Classification Search
USPC ............... 285/146.1, 146.2, 147.1, 907, 261
See application file for complete search history.

(56) References Cited

U.S. PATENT DOCUMENTS

| | | | | |
|---|---|---|---|---|
| 149,842 A | * | 4/1874 | Deeds ........................ | F16L 7/00 138/113 |
| 428,023 A | * | 5/1890 | Schoff .................... | F16M 11/40 138/120 |
| 570,405 A | * | 10/1896 | Jerguson ............... | F16L 27/053 138/120 |
| 1,140,508 A | * | 5/1915 | Forth ..................... | F16L 19/005 277/507 |
| 1,284,099 A | | 11/1918 | Harris | |
| 1,822,624 A | | 3/1929 | Hoeftmann | |
| 2,041,847 A | * | 5/1936 | Marchand ............... | F21V 21/26 248/160 |
| 2,564,938 A | * | 8/1951 | Warren ................. | F16L 27/047 277/507 |
| 2,694,585 A | * | 11/1954 | Fiori ........................ | F21S 8/00 16/337 |
| 3,544,137 A | | 12/1970 | Contreras | |

(Continued)

FOREIGN PATENT DOCUMENTS

DE          394695 C     5/1924
WO     2004088810 A1    10/2004

OTHER PUBLICATIONS

Translation of DE 394695.*

*Primary Examiner* — Aaron Dunwoody
(74) *Attorney, Agent, or Firm* — Law Offices of Mark L. Berrier

(57) ABSTRACT

Modular conduit systems in which a plurality of tubular link components are interconnected to form a continuous conduit. Each adjacent pair of tubular link components has a ball-and-socket joint that enables the pair of tubular link components to be pivoted with respect to each other. The ball-and-socket joint consists of a ball attached to a first one of the pair of adjacent tubular link components and a socket attached to a second one of the pair of adjacent tubular link components, where the ball is positioned within the socket. The amount of friction between the ball and the socket is adjustable, so that the amount of force required to pivot the pair of tubular link components with respect to each other, which is dependent upon the amount of friction between the ball and the socket, is variable.

7 Claims, 4 Drawing Sheets

(56) References Cited

U.S. PATENT DOCUMENTS

| | | | | |
|---|---|---|---|---|
| 3,695,645 | A | * | 10/1972 | Mommsen ............ F16L 37/144 24/581.1 |
| 3,695,646 | A | * | 10/1972 | Mommsen ............ F16L 37/144 24/581.1 |
| 4,767,231 | A | * | 8/1988 | Wallis ................... F16C 11/106 248/276.1 |
| 4,856,822 | A | | 8/1989 | Parker |
| 5,197,767 | A | | 3/1993 | Kimura |
| 5,986,215 | A | | 11/1999 | Watanabe |
| 6,109,662 | A | | 8/2000 | van Zuthem |
| 6,682,103 | B1 | | 1/2004 | Poirer |
| 7,770,937 | B2 | | 8/2010 | Ignaczak |
| 8,047,236 | B2 | * | 11/2011 | Perry ................... A61B 1/0055 135/155 |
| 2002/0167167 | A1 | * | 11/2002 | Elder ................. B29C 45/0003 285/261 |
| 2005/0006894 | A1 | * | 1/2005 | Karasawa ............. F16L 37/138 285/146.1 |
| 2005/0082824 | A1 | * | 4/2005 | Luettgen ............... H01R 35/00 285/146.1 |
| 2009/0121477 | A1 | * | 5/2009 | Pradeilles ............... F16L 11/18 285/146.1 |

\* cited by examiner

MODULAR CONDUIT SYSTEM

BACKGROUND

Field of the Invention

The invention relates to systems and methods for forming flexible conduits that utilize interlocking links that are individually adjustable to allow a user to modify the tension between the links and thereby fine-tune the ability of the conduit to flex to a desired position, but also provide enough rigidity for the conduit to support other system components to which the conduit is connected.

Related Art

Various modular conduit systems are known. These conduits are used for purposes such as protecting electrical, hydraulic or other lines that are positioned within the modular conduits. For instance, U.S. Pat. No. 394,695 to Shutz, U.S. Pat. No. 1,822,624 to Hoeftmann, and U.S. Pat. No. 5,986,215 to Watanabe disclose modular conduit systems for protecting cables in potentially harsh environments such as the sea floor. The modular conduits may also be used as structural components in a system, where the conduit provides a flexible means to position and support other components of the system. For example, U.S. Pat. No. 5,197,767 to Kimura discloses an articulable supporting sheath. Modular conduits may also be used to form or connect pipes, as in the examples of U.S. Pat. No. 1,284,099 to Harris and U.S. Pat. No. 4,856,822 to Parker.

One conventional modular conduit is marketed and sold under the name "Loc-Line". This product has a series of components or links that are interconnected by ball-and-socket joints (a ball at the end of one component fits into a socket of an adjacent component. The ball pivots within the socket to allow the relative positions of the components to be adjusted. The links can be moved so that the entire conduit is flexed. The friction between the links normally holds the conduit in a desired position. The links can be male-female (ball on one end, socket on the other), male-male (ball on both ends), female-female (sockets on both ends), or male/female on one end and a non-ball-and-socket termination on the other end. The links can be straight, angled, curved, etc. and can be made in various sizes.

There are several problems with modular conduits such as this. For example, the links are typically connected by pushing the ball of one link into the socket of another link. This makes the links easy to assemble, but it also causes the links to easily become disconnected as well. Additionally, as the links wear, they become looser and move more freely with respect to each other. As a result, the conduit formed by the links is less likely to maintain a desired position. Still further, because the links are intended to be easily repositioned, the conduit formed by the links typically cannot hold much weight.

SUMMARY OF THE INVENTION

The various embodiments of the invention may solve one or more of these problems by providing means to adjust the tension of each link. In other words, each link can be tightened to increase the friction between links, thereby making the links hold their respective positions better. Alternatively, each link can be loosened to decrease the friction between links, thereby making the links move more freely with respect to each other. The individual links can be individually tightened or loosened so that portions of the conduit are more rigid and support more weight, while other portions are more easily repositioned.

One embodiment comprises a modular conduit system that includes a plurality of tubular link components which are interconnected to form a continuous conduit. Each adjacent pair of tubular link components has a ball-and-socket joint that enables the pair of tubular link components to be pivoted with respect to each other. The ball-and-socket joint consists of a ball attached to a first one of the pair of adjacent tubular link components and a socket attached to a second one of the pair of adjacent tubular link components, where the ball is positioned within the socket. The amount of friction between the ball and the socket is adjustable, so that the amount of force required to pivot the pair of tubular link components with respect to each other, which is dependent upon the amount of friction between the ball and the socket, is variable.

In one embodiment, each tubular link component is split into two halves. The opposing halves are secured to each other by means such as screws that can provide an adjustable securing force. The halves of each of the tubular link components may be substantially identical to facilitate manufacturing and to reduce costs. The tubular link components may be designed to leave a gap between the halves to allow them to be drawn toward each other, thereby increasing the amount of friction in the ball-and-socket joint.

The modular conduit system may include a base component which is connected to a first end of the conduit, as well as a head component which is connected to a second end of the conduit. The conduit is supported by the base component, and the head component is supported by the conduit. The base component may include, for example, a rechargeable battery, while the head component may include a light that is powered by the battery. Electrical and control lines may be coupled between the base component and the head component. These lines may be positioned within the conduit formed by the plurality of tubular link components.

Another embodiment may comprise a first tubular link for use in a modular conduit. The tubular link has a tubular member with a first, male end and a second, female end. The male end has a spherical outer surface has the same radius of curvature a spherical inner surface of the female end so that a series of the tubular links can be joined together (each having its male end inserted into the female end of an adjacent link) to form a flexible modular conduit. The tubular member is divided longitudinally into two separable halves that are adjustably secured together. The amount of force that is applied by the halves at the female end to a male end of an adjacent tubular link is adjustable to modify the amount of friction between the tubular links and thereby control the flexibility or rigidity of the joint between the tubular links. The separable halves of the tubular link may be substantially identical, and may be secured to each other with screws. When the two halves are secured to each other, a gap may be left between the halves, so that the two halves can be drawn toward each other, to increase the amount of friction between the female end of the tubular link and the male end of the adjacent tubular link.

Numerous other embodiments are also possible.

BRIEF DESCRIPTION OF THE DRAWINGS

Other objects and advantages of the invention may become apparent upon reading the following detailed description and upon reference to the accompanying drawings.

Figure 1A:
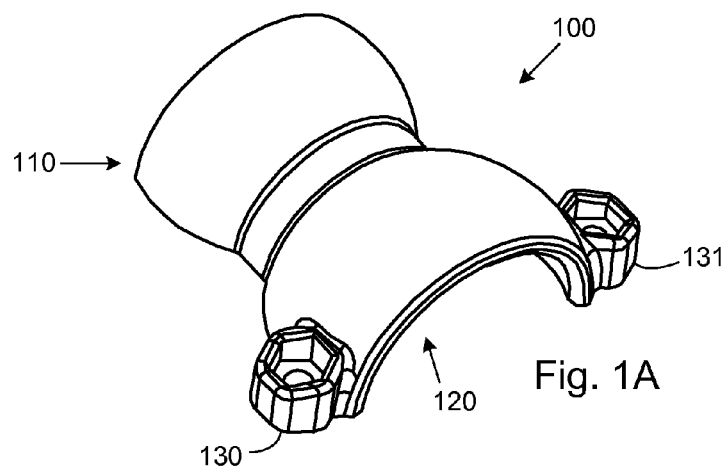
FIGS. 1A-1D are a set of diagrams illustrating an exemplary modular conduit link in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims. Further, the drawings may not be to scale, and may exaggerate one or more components in order to facilitate an understanding of the various features described herein.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

In one embodiment, interlocking links are used to form a flexible conduit. Each link has a male end and a female end, where the male end of one link is sized to fit within the female end of another link. The links are individually adjustable to control the friction between them, thereby controlling the amount of force that is required to move the links with respect to each other. A greater amount of friction makes the links more difficult to move, while less friction allows the links to move more freely.

In one embodiment, the modular conduit can be used as a flexible support for a tool such as a portable lighting unit. In this embodiment, the conduit extends from a base that houses a rechargeable battery to a lighting head that is powered by the battery. Electrical lines from the battery to the lighting head are enclosed within the conduit to protect them. The links that form the conduit may be tightened as needed to ensure that the conduit is sufficiently rigid to support the lighting head on the base, while maintaining a desired amount of flexibility to enable the lighting head to be properly positioned with respect to the base. As the individual links wear and become looser, they can be re-tightened to ensure that the conduit provides the desired support and flexibility.

The invention therefore provides several advantages. For instance, after the links are assembled to form a conduit, the links can be tightened to prevent the links from being disconnected from each other, which can be a problem in conventional modular conduits. Another advantage is that the links can be tightened to hold more weight, or loosened to make the conduit more easily flexible. Further, the links can be tightened to account for wear. In other words, as the conduit is used and the joints become looser and less capable of supporting a desired weight, the links can be tightened so they become stiffer, so the conduit remains useful for a longer period of time. Yet another advantage is that the links can be independently adjusted. It may be desirable for some portions of the modular conduit to be stiffer while others are more flexible. Individual links of the present modular conduit can be adjusted to achieve the desired characteristics in different parts of the conduit.

Figure 1B:
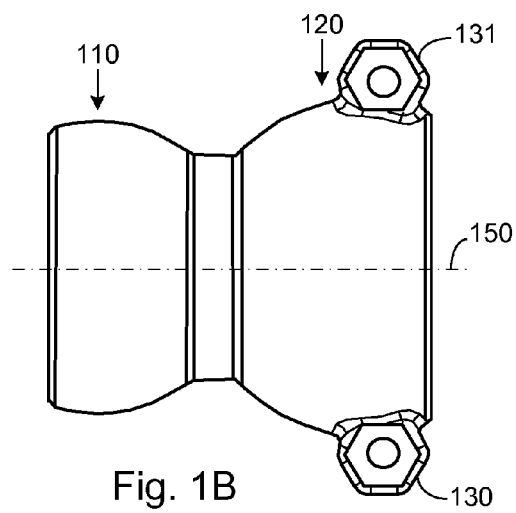
Figure 1C:
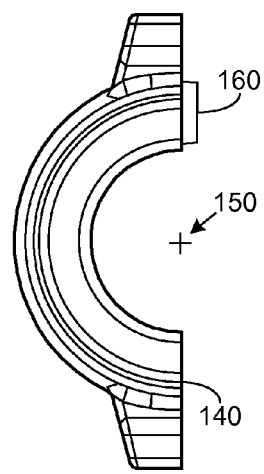
Figure 1D:
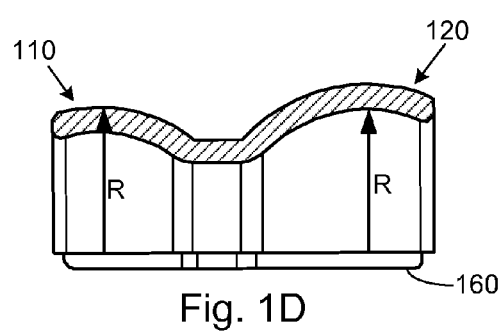

Referring to FIGS. 1A-1D, a set of diagrams illustrating an exemplary modular conduit link is shown. The term "link" may be used herein to refer alternately to the link of the modular conduit and to the component that forms half of the link (specifically as depicted in FIGS. 1A-1D. FIG. 1A shows a perspective view of one of the halves of the link. FIG. 1B shows a top view of the link. FIG. 1C shows an end view of the link. FIG. 1D shows a cross-section of the link.

The component 100 shown in FIGS. 1A-1D has a first, male end 110 and a second, female end 120. Each of these ends has a generally spherical shape. The outer diameter of male end 110 has substantially the same radius (R) as the inner diameter of female end 120, so that the male end will fit within the female and maintain contact over a substantial portion of the respective surfaces (male outer diameter and female inner diameter). Each half-link component 100 has a flat surface 140 that can be positioned against (or nearly against) the corresponding surface of another half-link. When two of half-links 100 are positioned in this manner, they form a link that is generally symmetric about axis 150.

A pair of protrusions 130 and 131 extend outward from the female end 120 of component 100. Each of protrusions 130 and 131 has a hole therethrough to accommodate a screw (or bolt). The screws secure the protrusions of one half-link to the protrusions of the other half-link. A tab 160 on each half-link is provided to fit within a corresponding recess in the other half-link to help align the two. It is noted that the use of two identical half-links to form the modular conduit link may reduce manufacturing costs (as compared to manufacturing two different halves that are not identical).

As noted above, two half-links 100 are secured to each other to form a link. Multiple links are then assembled to form a conduit. After several of the links are constructed from the half-links, the male end of a first link is inserted into the female end of a second link. It may be helpful to loosen the screws that secure the halves of the second link at its female end, allowing the halves to move apart slightly. After the male end of the first link is inserted into the female end of the second link, the screws may be tightened to draw the halves together, thereby retaining the male end of the first link in the female end of the second link. This process is repeated with as many links as desired to form a conduit.

Because the ends of each link are spherical, the links can pivot with respect to each other. The screws at the female end of each link can be tightened or loosened to provide the desired amount of friction at the joint between the links. As explained above, the more the screws are tightened, the more friction there is between the links, and the harder it is to move the links at the joint. While this makes the joint more difficult to flex, it enables the joint to support more weight.

Conventional modular conduits, on the other hand, are typically one-piece links that are snapped together and are not adjustable in this manner. If there is wear between the links of a conventional modular conduit, the joint becomes looser, and the weight that can be supported by the joint is reduced. At some point, the conventional modular conduit may not be able to support the weight for which it was originally designed, and it may simply have to be replaced.

The adjustability of the present modular conduit allows it to be adjusted for wear, thereby extending the useful life of the conduit.

It should be noted that some conventional modular conduits use a two-piece design rather than a one piece design. These conventional two-piece designs, however, do not provide means to adjust the friction at each joint, and consequently do not allow the flexibility and support provided at each joint to be modified.

In one embodiment, the half-links may be sized so that the flat surfaces (140) of the two half-links may not quite touch each other when they are assembled into a conduit. This gap between the half-links may facilitate the adjustment of the friction at the joint by allowing the spacing between the halves of the female end to be changed. In other words, if the halves are already touching, the tightening of the screws may not bring the halves closer together and consequently may not increase the friction at the joint. The gap may allow the halves of the female end to better clamp down on the male end of the other link. It should be noted that the desirability of the gap between the half-links may not be necessary in all embodiments.

Figure 2:
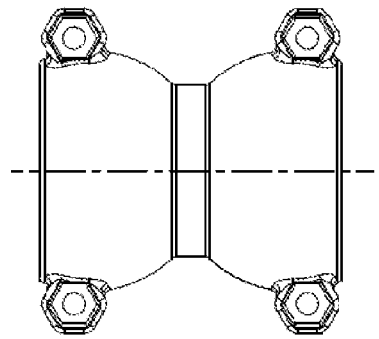
FIG. 2 is a diagram illustrating a link that has two female ends in accordance with one embodiment.
Figure 3:
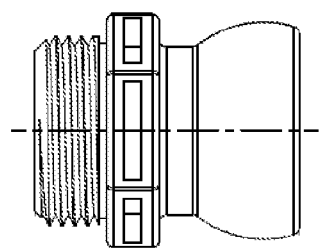
FIG. 3 is a diagram illustrating a link that has a first end that is male and a second end that has a threaded connection in accordance with one embodiment.
Figure 4:
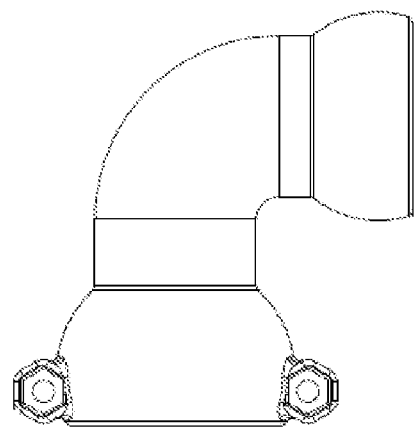
FIG. 4 is a diagram illustrating a link that forms an elbow in accordance with one embodiment.

While the body of the present modular conduit may be formed primarily be links as described above and shown in FIGS. 1A-1D, it may be desirable to include other types of links in the conduit as well. Several examples of these alternative types of links are shown in FIGS. 2-4. FIG. 2 shows a link that has two female ends (a female-female link). Each of the female ends is as described above. This link is designed to be coupled to the male end of an adjoining link so that the conduit terminates with a female end rather than a male end. A male-male link may alternatively be used to change the end of the conduit from female to male. A conduit could also be formed using alternating male-male and female-female links.

FIG. 3 shows a link that has a first end that is male (as described above) and a second end that has a threaded connection. This link may be used, for example, to convert the end of a conduit from a female termination to a threaded termination. The male-threaded link may be used to enable the conduit to be coupled to a system component that accepts the threaded connection. In one embodiment, the threaded end of the link is screwed into a base that supports the conduit, or a head component that is itself supported by the conduit.

FIG. 4 shows a link that forms an elbow. This link may be useful when it is necessary for the conduit to make a sharper bend than is possible with a joint between male and female ends. The link depicted in FIG. 4 has a 90-degree bend, but alternative links could have angles that are greater than 90 degrees or less than 90 degrees.

Still other alternative types of links that are not shown in FIGS. 2-4 may also be used.

Figure 5:
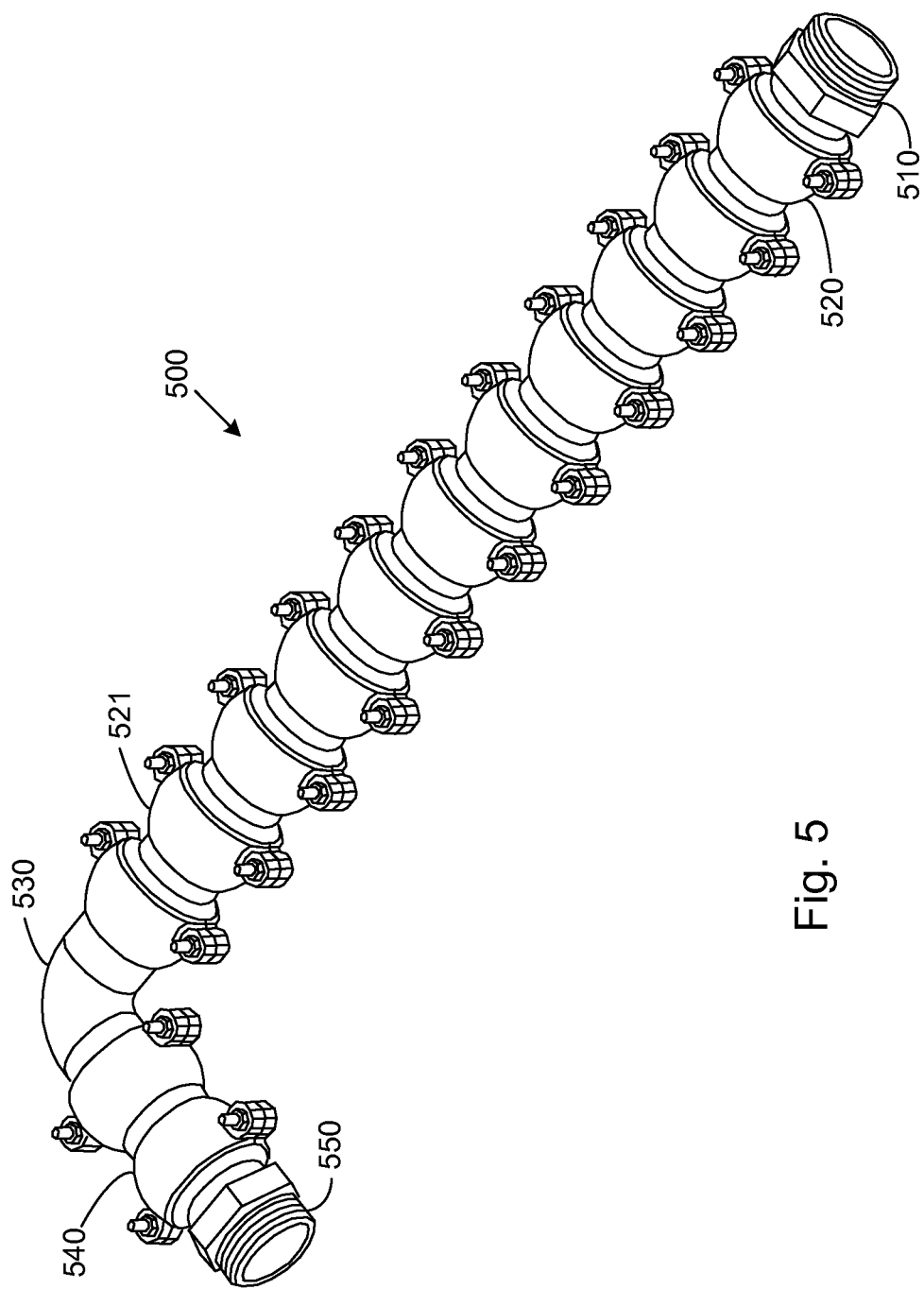
FIG. 5 is a diagram illustrating an assembled modular conduit having multiple links in accordance with one embodiment.

Referring to FIG. 5, an assembled modular conduit having multiple links is shown. As depicted in this figure, conduit 500 has a threaded connector (male-threaded link) coupled to a series of male-female links (e.g., 520). The male-female links are coupled to an elbow link 530, and a female-female link 540 is coupled to the other end of the elbow link. A second threaded connector 550 is coupled to female-female link 540 to terminate the modular conduit. Conduit 500 provides a means to adjustably connect and support components that are coupled to the ends of the conduit. Modular conduit 500 also provides a means to protect electrical and control lines between the components by running these lines through the hollow conduit.

Figure 6:
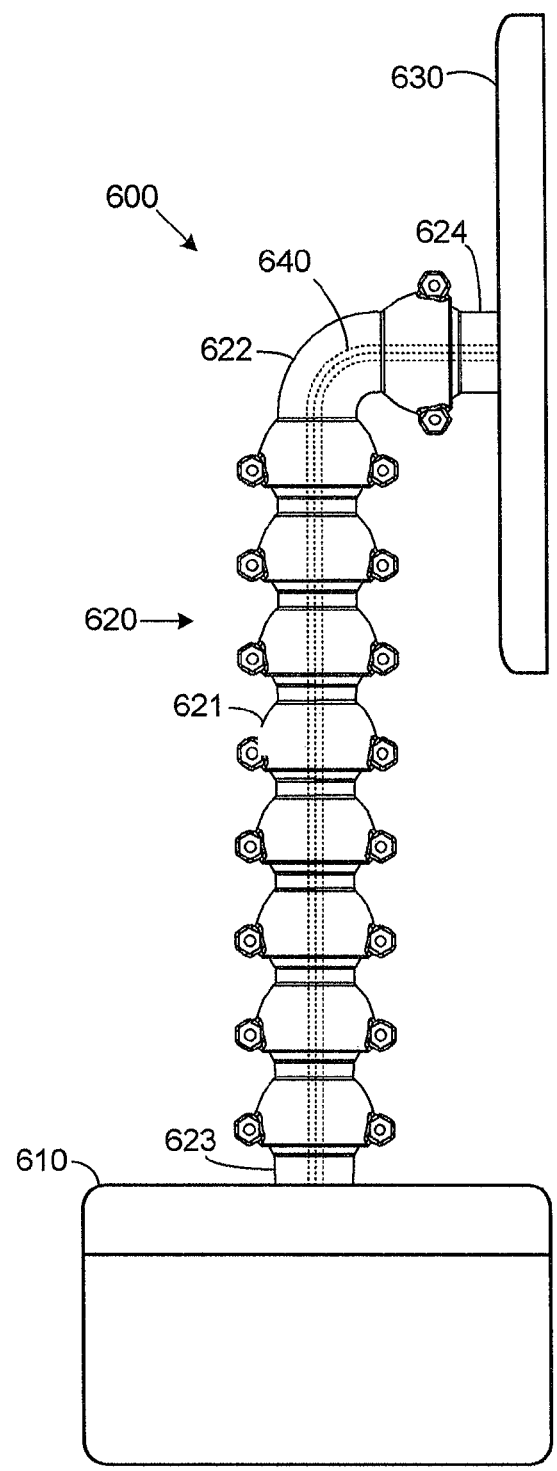
FIG. 6 is a diagram illustrating an exemplary tool utilizing a modular conduit in accordance with one embodiment.

Referring to FIG. 6, a diagram illustrating an exemplary tool utilizing the present modular conduit is shown. In this example, the tool is a portable lighting system 600. Lighting system 600 includes a base 610, and modular conduit 620 and a light head 630. Base 610 includes a rechargeable battery and has a flat bottom surface that allows the base to be placed on a work surface such as the floor. The base may also provide alternative means to position the system, such as a suction cup that may be used to mount the base on a workpiece.

Conduit 620 is coupled to base 610 by means of a threaded connector 623 similar to link 510 in FIG. 5. This connector is screwed into a corresponding set of female threads in the top of base 610. Modular conduit 620 also includes a series of male-female links (e.g., 621), a female-female elbow (622) and a second threaded connector 624. Second threaded connector 624 screws into a corresponding threaded socket in the back of light head 630, so that the light head is adjustably supported by conduit 620, which is in turn supported by base 610. Electrical lines (wires) 640 connected to the battery in base 610 are run through modular conduit 620 and are connected to light head 630 to provide power for the light. One or more control lines may also be run through the conduit to enable the functions of the light head to be controlled from switches on base 610.) with the following new paragraph:

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A modular conduit system comprising:
    a plurality of tubular link components that are interconnected to form a contiguous conduit;
    wherein each adjacent pair of tubular link components has a ball-and-socket joint that enables the pair of tubular link components to be pivoted with respect to each other;
    wherein the ball-and-socket joint comprises a ball attached to a first one of the pair of adjacent tubular link components and a socket attached to a second one of the pair of adjacent tubular link components, the ball being positioned within the socket;
    wherein an amount of friction between the ball and the socket is adjustable and wherein an amount of force required to pivot the pair of tubular link components with respect to each other is dependent upon the amount of friction between the ball and the socket; and wherein the socket comprises two opposing halves, wherein the opposing halves are secured to each other by an adjustable securing force, wherein the amount of friction between the ball and the socket is adjustable by adjusting the securing force and thereby adjusting an amount of tension between the two halves.

2. The modular conduit system of claim 1, wherein one or more of the tubular link components is formed by securing two substantially identical half-links to each other.

3. The modular conduit system of claim 1, wherein when the two half-links are secured to each other, a gap is formed between the half-links, wherein the gap is adjustable to change the spacing between the two half-links, thereby changing an amount of friction in the ball-and-socket joint formed by the half-links.

4. The modular conduit system of claim 1, further comprising a base component to which a first end of the contiguous conduit is connected and a head component to which a second end of the contiguous conduit is connected, wherein the contiguous conduit is supported only by the base component and the head component is supported by the base through the contiguous conduit.

5. The modular conduit system of claim 4, further comprising one or more electrical lines coupled between the base component and the head component, wherein the one or more electrical lines are positioned within the contiguous conduit formed by the plurality of tubular link components.

6. The modular conduit system of claim 5, wherein the one or more electrical lines include one or more power lines that supply electrical power from the base component to the head component and one or more control lines that control one or more functions of the head component.

7. The modular conduit system of claim 1, wherein, for a plurality of the link components, each of the plurality of link components has a first end that forms a ball and a second end that forms a socket, wherein the first end of one of the link components is positioned within the second end of a second one of the link components so that the first link component pivots with respect to the second link component.

* * * * *